(No Model.)
F. WESTWOOD.
CARRIAGE CURTAIN FASTENING.
No. 260,719. Patented July 4, 1882.
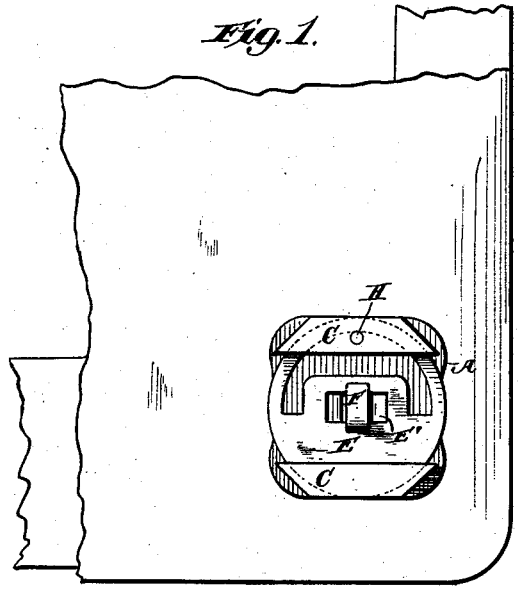
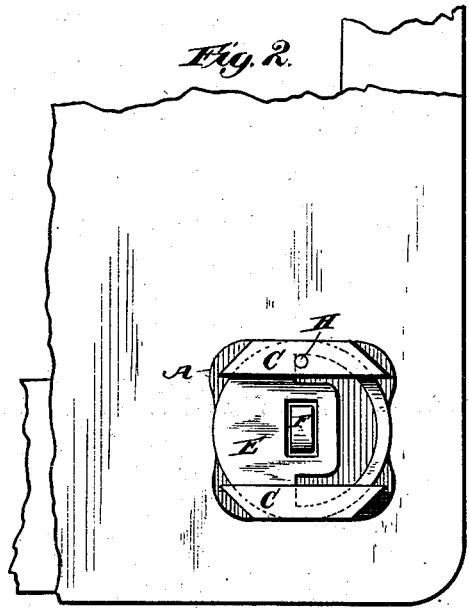
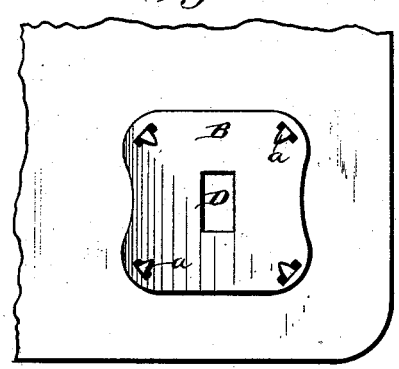
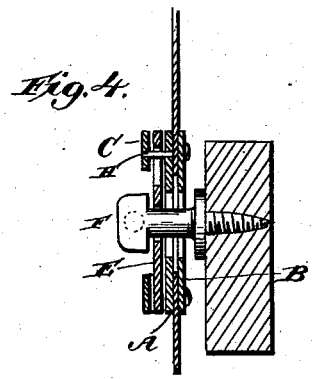
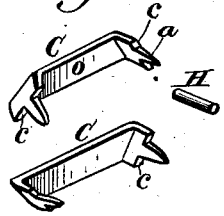
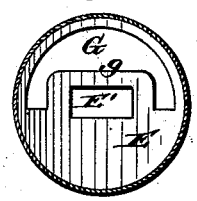
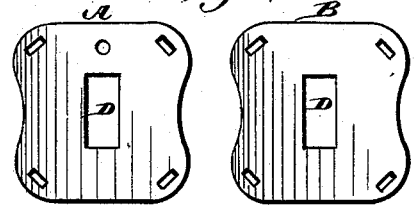
Witnesses.
Robert Everett,
J. A. Rutherford
Inventor.
Felix Westwood.
By James L. Norris,
Atty.

UNITED STATES PATENT OFFICE.

FELIX WESTWOOD, OF WHEELING, WEST VIRGINIA.

CARRIAGE-CURTAIN FASTENING.

SPECIFICATION forming part of Letters Patent No. 260,719, dated July 4, 1882.

Application filed April 14, 1882. (No model.)

*To all whom it may concern:*

Be it known that I, FELIX WESTWOOD, a citizen of the United States, residing at Wheeling, in the county of Ohio and State of West Virginia, have invented new and useful Improvements in Carriage-Curtain Fastenings, of which the following is a specification.

The object of this invention is to provide a simple, durable, and efficient fastening for carriage and other analogous curtains, and to so construct the fastening that it can be readily adjusted and applied, and when secured will not jar loose. To such end I clamp the curtain at the points to be fastened down between a pair of centrally-slotted metal plates, and within a seat that is formed upon the outer plate I arrange a loose metal disk, which, like the said two plates, is centrally slotted, so that when properly turned its slot can be brought coincident with the slots in the fixed plates, and thus allow a knob that is secured to the vehicle frame or body to be received in the three slots, after which the loose disk or locking-plate can be turned so as to bring its slot crosswise to the flat sides of the knob-head. This locking-plate has a semicircular slot, which receives a stud or pin for limiting the rotation of the locking-plate when its slot is brought coincident with the slots of the base-plates.

In the drawings, Figure 1 represents my improved fastening device applied to a curtain and locked upon the knob that is secured to the frame or body of a vehicle. Fig. 2 is a like view of the same with the locking-plate brought into position for allowing the fastening to be detached from the knob. Fig. 3 represents the rear clamping-plate. Fig. 4 shows a section taken transversely through the fastening device. Fig. 5 represents the plates for holding the locking-plate upon the outer clamping-plate. Fig. 6 represents the locking-plate, and Fig. 7 shows the two base or clamping plates.

The base portion of this fastening device consists of a pair of metal plates, A and B, which are clamped upon opposite sides of the curtain and secured by suitable rivets, or by means of the tangs $a$, which also serve to secure the plates C upon the outer face-plate. These base-plates are formed with coincident slots D for receiving the flat head of the knob that is permanently secured to the vehicle frame or body. The circular locking-plate E is retained upon the outer base-plate by means of the retaining-plates C, which are bent down at their ends and secured in position to overlap the locking-plate, as shown. The shoulders $c$ at the ends of these retaining-plates fit against the outer base-plate, while their tangs or pointed extremities $a$ pass through both of the base-plates, and are then bent down upon the inner plate, as indicated in Fig. 3, thereby binding the parts firmly together. In lieu of these tangs, however, screws or rivets could be employed for holding the several plates together, although the tangs constitute a simple mode of fastening together the said parts.

The locking-plate, which is capable of a limited rotation in the seat thus formed, is provided with a central slot, E', which, like the slots in the base-plates, is adapted to receive the flat head of the knob F when the side walls of the slot are brought parallel with the sides of the knob-head. The locking-plate is also provided with a semicircular slot, G, through which passes a stud or pin, H, that is secured in the outer base-plate and one of the retaining-plates C. This pin is arranged in line with the slots in the base-plates, and the ends of the semicircular slot terminate at points that are in a line taken centrally through the greatest length of the slot in the locking-plate, so that when the locking-plate is turned and brought into the position shown in Fig. 2 its slots will exactly register with the slots in the base-plates, and thus afford a free passage for the flat head of the knob.

In operating this device the locking-plate will be brought into the position shown in Fig. 2 and the locking and base plates then engaged upon the knob, after which, by giving the locking-plate a quarter-revolution, its slot will be brought transversely to the sides of the flat head on the knob, and thereby lock the fastening thereon. In this position the semi-circular slotted and lighter portion of the locking-plate will be at the top, while its solid heavier portion will be below, and hence the jarring to which the device is subjected will not shift the locking-plate round, since its heavier side will have a tendency to settle in the position indicated in Fig. 1. In order to further lighten the locking-plate at one side, its semicircular slot can be widened at its middle, as at $g$, thereby reducing the quantity of metal in this portion of the locking-plate.

In lieu of pin H, one of the retaining-plates could be formed with a stud or projection adapted to extend in the slot of the locking-plate. By means of said circular slot and pin or stud it will be seen that when the locking-plate is turned in either direction its rotation will be checked when the wall at the end of its slot strikes the said pin or stud, and in either instance the slot in the locking-plate will be brought coincident with the slots in the base-plate.

What I claim is—

1. A device for fastening curtains and the like, consisting of slotted base-plates secured to the curtain, and a locking-plate provided with a slot coinciding with the slot in the base-plates, and also provided with a semicircular slot in which a fixed pin or stud is received, the locking-plate being turned to bring its slot coincident with the slot in the base-plates to receive the elongated head and a fixed knob, and the pin and semicircular slot being adapted to limit the rotation of the locking-plate when said two slots are coincident, substantially as described.

2. The combination of the centrally-slotted base-plates, secured on opposite sides of the curtain, with the rotary centrally-slotted locking-plate provided at one side with a semicircular slot, the plates C for retaining the locking-plate upon the outer base-plate, and the fixed stud or pin received in the said semicircular slot, substantially as described.

3. The combination, with the flat-headed knob, of the centrally-slotted base-plates that are secured to the curtain, the rotary locking-plate provided with a straight and a semicircular slot, the fixed stud or pin received in said semicircular slot, and the retaining-plates C, formed at their ends with shoulders that fit against the outer base-plate, and also provided with tangs which pass through the two plates and are bent upon the inner base-plate, so as to bind the plates firmly together, substantially as described.

In testimony whereof I have hereunto set my hand in the presence of two subscribing witnesses.

FELIX WESTWOOD.

Witnesses:
   JAMES L. NORRIS,
   JAMES A. RUTHERFORD.